(12) United States Patent
Mukai

(10) Patent No.: US 7,732,070 B2
(45) Date of Patent: Jun. 8, 2010

(54) PERPENDICULAR MAGNETIC RECORDING MEDIUM, METHOD OF MANUFACTURING THE SAME, AND MAGNETIC STORAGE UNIT

(75) Inventor: Ryoichi Mukai, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 767 days.

(21) Appl. No.: 11/487,508

(22) Filed: Jul. 17, 2006

(65) Prior Publication Data

US 2007/0231608 A1    Oct. 4, 2007

(30) Foreign Application Priority Data

Mar. 31, 2006    (JP) .............................. 2006-100585

(51) Int. Cl.
*G11B 5/66* (2006.01)
(52) U.S. Cl. ..................................... 428/831
(58) Field of Classification Search ........................ None
See application file for complete search history.

(56) References Cited

U.S. PATENT DOCUMENTS

| | | | |
|---|---|---|---|
| 6,670,056 B2 * | 12/2003 | Hikosaka ..................... | 428/826 |
| 6,686,070 B1 * | 2/2004 | Futamoto et al. ............. | 428/827 |
| 7,175,925 B2 * | 2/2007 | Chen et al. ................... | 428/831 |
| 7,226,674 B2 | 6/2007 | Koda et al. | |
| 7,311,983 B2 | 12/2007 | Watanabe et al. | |
| 7,368,185 B2 * | 5/2008 | Hirayama et al. ......... | 428/831.2 |
| 7,470,474 B2 | 12/2008 | Sakawaki et al. | |
| 2004/0009375 A1 | 1/2004 | Tanahashi | |
| 2005/0014029 A1 | 1/2005 | Takenoiri et al. | |
| 2006/0286413 A1 | 12/2006 | Liu et al. | |

(Continued)

FOREIGN PATENT DOCUMENTS

JP    2001-23144 A    1/2001

(Continued)

OTHER PUBLICATIONS

Mukai et al., "Signal-to-medi-noise ratio improvement of CoCrPt-SiO2 granular perpendicular media by stacked Ru underlayer", J Appl Phys, vol. 97, No. 97, May 2005, pp. 10N119-1 to 10N119-3.*

(Continued)

Primary Examiner—Holly Rickman
(74) Attorney, Agent, or Firm—Westerman, Hattori, Daniels & Adrian, LLP

(57) ABSTRACT

A perpendicular magnetic recording medium is disclosed that includes a substrate; a soft magnetic underlayer formed on the substrate; a seed layer of an amorphous material formed on the soft magnetic underlayer; an oxidation prevention layer formed on the seed layer; an underlayer formed on the oxidation prevention layer, the underlayer including multiple crystal grains formed of Ru or a Ru alloy having an hcp crystal structure, and a first air gap part configured to separate the crystal grains from each other; and a recording layer formed on the underlayer, the recording layer including multiple magnetic particles having a magnetocrystalline easy axis in a direction substantially perpendicular to the surface of the substrate, and one of a second air gap part and a non-magnetic non-solid-solution phase, the one being configured to separate the magnetic particles from each other. The oxidation prevention layer includes a noble metal element other than Ru.

8 Claims, 5 Drawing Sheets

U.S. PATENT DOCUMENTS

2007/0065955 A1 3/2007 Maeda et al.

FOREIGN PATENT DOCUMENTS

| JP | 2003-115106 A | 4/2003 |
|---|---|---|
| JP | 2003-217107 A | 7/2003 |
| JP | 2003-317221 A | 11/2003 |
| JP | 2003-346334 A | 12/2003 |
| JP | 2004-22138 A | 1/2004 |
| JP | 2004-259423 A | 9/2004 |
| JP | 2004-310910 A | 11/2004 |
| JP | 2005-4945 A | 1/2005 |
| JP | 2005-353256 (A) | 12/2005 |

OTHER PUBLICATIONS

Mukai et al., "Microstructure improvement of thin Ru underlayer for CoCrPt-SiO2 granular perpendicular media", IEEE Trans Magn, vol. 41, No. 10, Oct. 2005, pp. 3169-3171.*

U.S. Office Action mailed Oct. 19, 2009, issued in corresponding U.S. Appl. No. 11/388,547.

Japanese Office Action mailed Feb. 2, 2010, issued in corresponding Japanese Application No. 2006-049313.

* cited by examiner

PERPENDICULAR MAGNETIC RECORDING MEDIUM, METHOD OF MANUFACTURING THE SAME, AND MAGNETIC STORAGE UNIT

CROSS-REFERENCE TO RELATED APPLICATION

The present application is based on Japanese Priority Patent Application No. 2006-100585, filed on Mar. 31, 2006, the entire contents of which are hereby incorporated by reference.

BACKGROUND OF THE INVENTION

1. Field of the Invention

The present invention relates generally to perpendicular magnetic recording media, methods of manufacturing the same, and magnetic storage units including the same, and more particularly to a perpendicular magnetic recording medium having a magnetic layer in which magnetic particles are separated by a non-magnetic material, a method of manufacturing the same, and a magnetic storage unit including the same.

2. Description of the Related Art

Magnetic storage units are employed in large-scale systems to a variety of apparatuses such as computers and communication devices of personal use. In each use, magnetic storage units are required to record information with higher density and transfer information at higher speed.

According to perpendicular magnetic recording, information is recorded in a magnetic recording medium by magnetizing the recording layer of the magnetic recording medium in a direction perpendicular to its substrate surface. Accordingly, compared with longitudinal (in-plane) magnetic recording, the recorded information is less likely to disappear. Therefore, perpendicular magnetic recording can perform recording with higher density than longitudinal magnetic recording.

Perpendicular magnetic recording media are formed by stacking a soft magnetic underlayer formed of a soft magnetic material on a substrate and stacking a recording layer on the soft magnetic underlayer. Usually, the recording layer is formed of a CoCr-based alloy. The CoCr-based alloy is formed by sputtering while applying heat to the substrate, so that non-magnetic Cr is segregated at the grain boundary between Co-rich magnetic particles of the CoCr-based alloy, thereby magnetically isolating the magnetic particles from one another.

On the other hand, the soft magnetic underlayer forms the magnetic path of magnetic flux flowing into a magnetic head at the time of reproduction. In a crystalline soft magnetic material, spike noise is generated because of magnetic domains. Therefore, the soft magnetic underlayer is formed of an amorphous or microcrystalline body, for which it is difficult to form magnetic domains. Accordingly, the heating temperature at the time of forming the recording layer is restricted in order to avoid crystallization of the soft magnetic underlayer.

Therefore, a recording layer having a so-called granular columnar structure where magnetic particles of a CoCr-based alloy are separated from one another by a SiO2 non-magnetic parent phase is proposed as a recording layer that isolates magnetic particles from one another and does not require heat treatment at high temperature. Further, it is also proposed to form a Ru film as the underlayer of a recording layer in order to form a columnar structure in which the c-axis of a magnetic particle grows in a direction perpendicular to the surface of a substrate and cause the magnetic particles to grow at substantially equal intervals (see, for example, Japanese Laid-Open Patent Application No. 2005-353256).

The magnetic particles of the recording layer perform crystal growth on the surface of the Ru film. Accordingly, the crystal orientation of the magnetic particles is significantly affected by the crystal orientation of the Ru film. That is, the (0002) crystal planes of the Ru film preferentially serve a's growth planes, and the Co (0002) crystal planes of the magnetic particles grow on the growth planes. An increase in the proportion of the (0002) crystal planes of the Ru film which planes are not parallel to the substrate surface affects the orientation of the Co (0002) crystal planes. This increases the proportion of those of the multiple magnetic particles whose magnetocrystalline easy axes (c-axes) are not perpendicular to the substrate surface, thus degrading so-called magnetocrystalline easy axis orientation dispersion. In particular, the Ru film is formed in an inert gas atmosphere of Ar gas or the like by sputtering, and the crystal orientation of the Ru film in its initial growth condition is easily disturbed in a manufacturing apparatus because of the effect of oxygen gas adsorbed on the inner wall of a film formation chamber. This disturbance has an adverse effect on the entire Ru film and further on the magnetic particles of the recording layer. This degrades recording and reproduction characteristics, thus causing the problem of making it difficult to achieve a further increase in recording density, that is, so-called higher recording density.

SUMMARY OF THE INVENTION

Embodiments of the present invention may solve or reduce the above problem.

In an embodiment of the present invention, there is provided a perpendicular magnetic recording medium in which the above-described problem is solved.

In an embodiment of the present invention, there are provided a perpendicular magnetic recording medium having a recording layer with good crystalline orientation so as to be capable of increasing recording density, a method of manufacturing the same, and a magnetic storage unit including the same.

In an embodiment of the present invention, there is provided a perpendicular magnetic recording medium including a substrate; a soft magnetic underlayer formed on the substrate; a seed layer of an amorphous material formed on the soft magnetic underlayer; an oxidation prevention layer formed on the seed layer; an underlayer formed on the oxidation prevention layer, the underlayer including multiple crystal grains formed of one of Ru and a Ru alloy having an hcp crystal structure, and a first air gap part configured to separate the crystal grains from each other; and a recording layer formed on the underlayer, the recording layer including multiple magnetic particles having a magnetocrystalline easy axis in a direction substantially perpendicular to the surface of the substrate, and one of a second air gap part and a nonmagnetic non-solid-solution phase, the one being configured to separate the magnetic particles from each other, wherein the oxidation prevention layer includes a noble metal element other than Ru.

According to one aspect of the present invention, oxidation of the surface of an oxidation prevention layer is prevented by providing the oxidation prevention layer including a noble metal element other than Ru between a seed layer and an underlayer. If an oxidized part is formed on the surface of the oxidation prevention layer, the crystallinity and the crystal orientation of the initial growth part of the crystal grains of the underlayer formed of Ru or a Ru alloy having an hcp structure are degraded. However, since the oxidation prevention layer has good resistance to oxidation, an oxidized part is prevented from being generated on the surface of the oxidation prevention layer. As a result, the underlayer has good crystal orientation, which is inherited by the recording layer, so that the magnetic particles of the recording layer have better crystal orientation. This results in good recording and reproduction characteristics, so that a perpendicular magnetic recording medium can achieve high recording density.

According to another embodiment of the present invention, there is provided a magnetic storage unit that includes a recording and reproduction part including a magnetic head, and the above-described perpendicular magnetic recording medium.

This magnetic storage unit has good recording and reproduction characteristics and excellent signal-to-noise ratio, and can achieve high recording density.

In another embodiment of the present invention, there is provided a method of manufacturing a perpendicular magnetic recording medium, the perpendicular magnetic recording medium having a soft magnetic underlayer, a seed layer, an oxidation prevention layer, an underlayer, and a recording layer stacked in order on a substrate; the recording layer including multiple magnetic particles having a magnetocrystalline easy axis in a direction substantially perpendicular to the surface of the substrate, and a non-magnetic non-solid-solution phase configured to separate the magnetic particles from each other; the method including the steps of: (a) forming the oxidation prevention layer on the seed layer, the oxidation prevention layer including a noble metal element other than Ru; and (b) forming the underlayer on the oxidation prevention layer by sputtering using a material formed of one of Ru and a Ru alloy having an hcp crystal structure at a deposition rate lower than or equal to 1 nm/sec and at a pressure higher than or equal to 2.66 Pa.

According to another aspect of the present invention, even if oxygen gas is included as an impurity gas in an atmospheric gas, provision of an oxidation prevention layer causes the crystal grains of an underlayer formed thereon to have good crystallinity and crystal orientation because the oxidation prevention layer has good resistance to oxidation. Further, the good crystallinity and crystal orientation are inherited by a recording layer, so that its magnetic particles have better crystal orientation. As a result, it is possible to manufacture a perpendicular magnetic recording medium having better recording and reproduction characteristics and capable of achieving high recording density.

Thus, it is possible to provide a perpendicular magnetic recording medium having a recording layer with good crystal orientation and capable of achieving high recording density, a method of manufacturing the same, and a magnetic storage unit including the same.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given below, with reference to the accompanying drawings, of embodiments of the present invention.

First Embodiment

Figure 1:
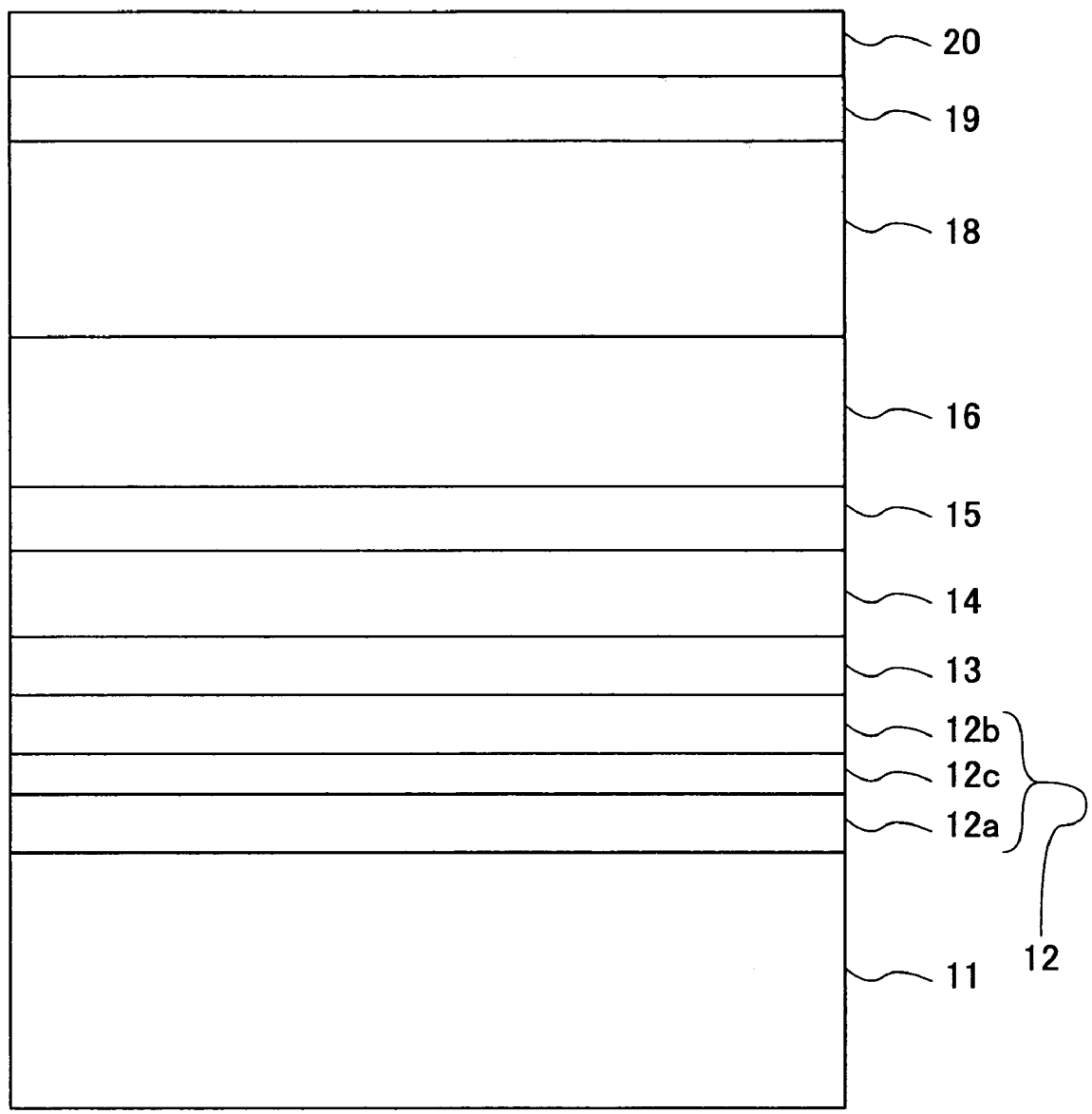
FIG. 1 is a cross-sectional view of a perpendicular magnetic recording medium according to a first embodiment of the present invention.
Figure 2:
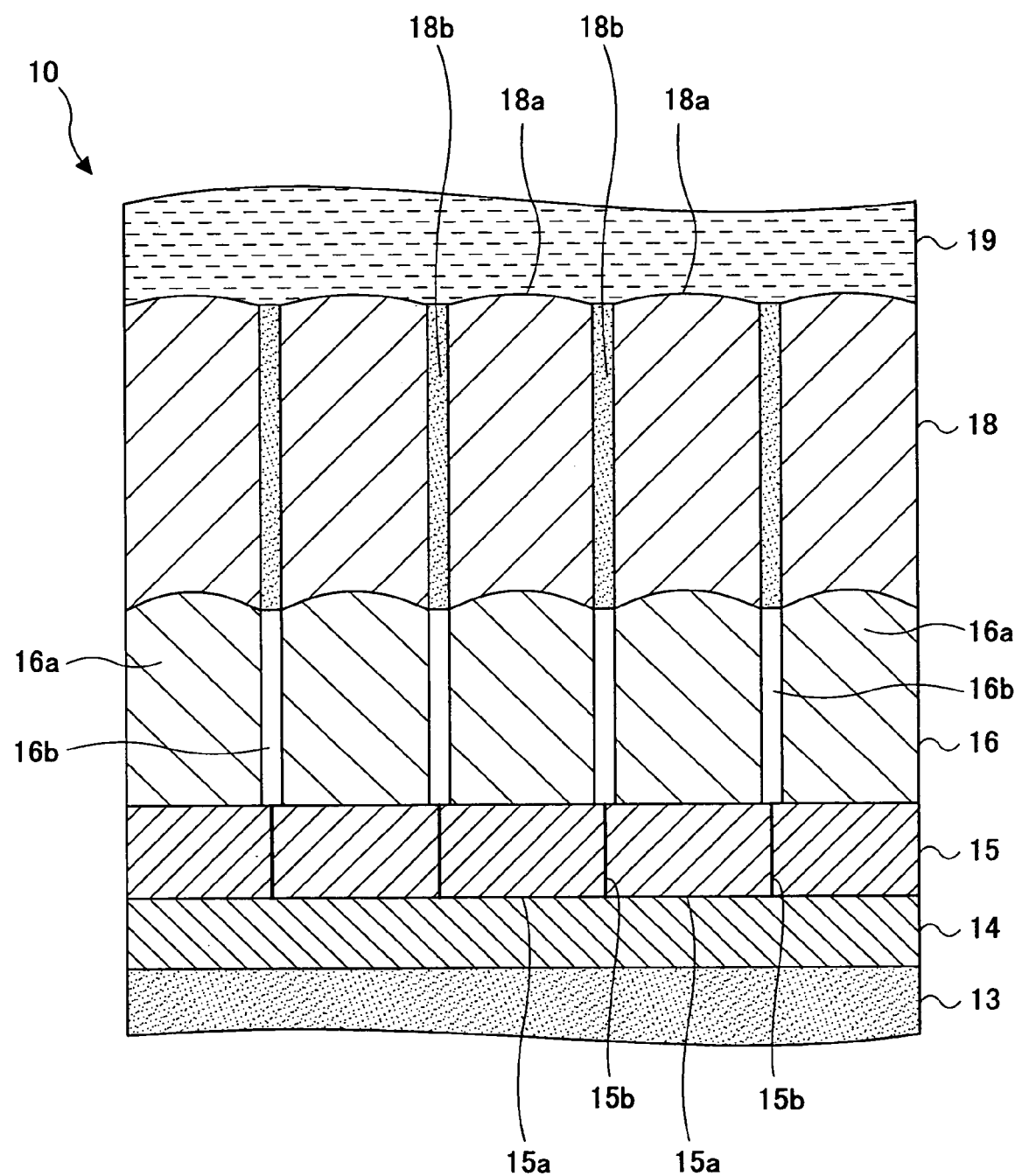
FIG. 2 is a schematic enlarged view of part of the perpendicular magnetic recording medium shown in FIG. 1 according to the first embodiment of the present invention.

FIG. 1 is a schematic cross-sectional view of a perpendicular magnetic recording medium 10 according to a first embodiment of the present invention. FIG. 2 is a schematic enlarged view of part of the perpendicular magnetic recording medium 10 shown in FIG. 1.

Referring to FIGS. 1 and 2, the perpendicular magnetic recording medium 10 according to the first embodiment includes a substrate 11, a layered soft magnetic underlayer body 12, a seed layer 13, an oxidation prevention layer 14, a first underlayer 15, a second underlayer 16, a recording layer 18, a protection film 19, and a lubricating layer 20. The layered soft magnetic underlayer body 12, the seed layer 13, the oxidation prevention layer 14, the first underlayer 15, the second underlayer 16, the recording layer 18, the protection film 19, and the lubricating layer 20 are stacked in this order on the substrate 11.

The substrate 11 is, for example, a plastic substrate, a crystallized glass substrate, a toughened glass substrate, a Si substrate, or an aluminum alloy substrate. If the perpendicular magnetic recording medium 10 is a magnetic disk, a disk substrate is employed. Further, if the perpendicular magnetic recording medium 10 is a magnetic tape, a film of polyester (PET), polyethylene naphthalate (PEN), or polyimide (PI) having good heat resistance may be employed as the substrate 11.

The layered soft magnetic underlayer body 12 includes two amorphous soft magnetic layers 12a and 12b and a non-magnetic coupling layer 12c formed therebetween. The magnetizations of the amorphous soft magnetic layers 12a and 12b are antiferromagnetically coupled through the non-magnetic coupling layer 12c. Each of the amorphous soft magnetic layers 12a and 12b is formed of, for example, an amorphous soft magnetic material of 50 nm to 2 μm in film thickness including at least one element selected from Fe, Co, Ni, Al, Si, Ta, Ti, Zr, Hf, V, Nb, C, and B. Specific examples of the material of the amorphous soft magnetic layers 12a and 12b includes FeSi, FeAlSi, FeTaC, CoNbZr, CoCrNb, CoFeB, and NiFeNb.

If the substrate 11 has a disk shape, it is preferable that each of the amorphous soft magnetic layers 12a and 12b have a magnetocrystalline easy axis in a radial direction. As a result, in the state of residual magnetization, the magnetization of the amorphous soft magnetic layer 12a is directed toward the center, and the magnetization of the amorphous soft magnetic layer 12b is directed toward the periphery. This configuration makes it possible to prevent formation of magnetic domains in the amorphous soft magnetic layers 12a and 12b and prevent generation of a leakage magnetic field emanating from the interface between magnetic domains.

It is preferable that the amorphous soft magnetic layers 12a and 12b employ a soft magnetic material of the same composition. Further, it is preferable that the amorphous soft magnetic layers 12a and 12b be equal in film thickness to each other. As a result, the magnetic fields leaking from the amorphous soft magnetic layers 12a and 12b cancel each other, so that the noise of the reproduction element of a magnetic head is reduced. The amorphous soft magnetic layers 12a and 12b may employ respective soft magnetic materials different in composition from each other.

The non-magnetic material of the non-magnetic coupling layer 12c is selected from the group consisting of Ru, Cu, Cr, Rh, Ir, Ru-based alloys, Rh-based alloys, and Ir-based alloys. A non-magnetic material including Ru and at least one of Co, Cr, Fe, Ni, and Mn is suitable as a Ru-based alloy. The film thickness of the non-magnetic coupling layer 12c is determined within such a range as to allow antiferromagnetic exchange coupling of the amorphous soft magnetic layer 12a and the amorphous soft magnetic layer 12b. The range is 0.4 nm to 1.5 nm.

The layered soft magnetic underlayer body 12 may be configured to further include a layered body of a non-magnetic coupling layer and an amorphous soft magnetic layer on the amorphous soft magnetic layer 12b. Alternatively, the layered soft magnetic underlayer body 12 may be configured to have two or more such layered bodies stacked on the amorphous soft magnetic layer 12b. In these cases, letting the product of film thickness and residual magnetization per unit volume of each amorphous soft magnetic layer be "film thickness-residual magnetization product", it is preferable that the sum of the film thickness-residual magnetization products of the amorphous soft magnetic layers be substantially 0 (zero). This can substantially eliminate the leakage flux from the layered soft magnetic underlayer body 12.

The seed layer 13 is formed of, for example, an amorphous non-magnetic material of at least one selected from the group consisting of Ta, Ti, Mo, W, Re, Hf, and Mg having a film thickness of 2 nm to 10 nm (preferably 2 nm to 5 nm). Since the seed layer 13 is amorphous, the seed layer 13 does not affect the crystal orientation of the oxidation prevention layer 14 thereon. This facilitates the self-organizational crystal orientation of the oxidation prevention layer 14, thus improving its crystal orientation.

The oxidation prevention layer 14 is formed of a material including a noble metal element other than Ru. That is, the oxidation prevention layer 14 is formed of a material including at least one selected from the group consisting of Au, Ag, Rh, Pd, Os, Ir, and Pt. The noble metal element is less likely to be oxidized even if it is formed into a film in an inert gas atmosphere in which oxygen gas is included as an impurity. In particular, in a sputtering apparatus used in manufacturing, the surface of a seed layer is subjected to oxidation by oxygen gas included as an impurity gas in an inert gas used as an atmospheric gas or by oxygen adsorbed on the inner wall of a pipe for introducing an inert gas or of a film formation chamber and removed therefrom to be oxygen gas. According to the present invention, however, such oxidation can be prevented by the oxidation prevention layer 14 including a noble metal element. It is preferable that the oxidation prevention layer 14 be formed of at least one selected from the group consisting of Pt, Au, and Ag in particular. These elements are highly resistant to oxygen. Further, Pt is particularly preferable in preventing oxidation of the surface of the oxidation prevention layer 14 and activating the oxidation prevention layer 14.

Further, the oxidation prevention layer 14 has its (111) crystal plane preferentially oriented self-organizationally on the seed layer 13. The Ru (0002) crystal plane of the first underlayer 15 grows on the (111) crystal plane of the oxidation prevention layer 14 with good lattice matching. Accordingly, provision of the oxidation prevention layer 14 causes the first underlayer 15 to have good crystallinity and good crystal orientation. The good crystallinity and crystal orientation are inherited through the second underlayer 16 by the recording layer 18, so that the crystal orientation of magnetic particles 18a (FIG. 2) of the recording layer 18 is improved. This results in better recording and reproduction characteristics, so that it is possible to increase recording density.

Further, it is preferable that the oxidation prevention layer 14 be greater than or equal to 2 nm in film thickness. If the oxidation prevention layer 14 is less than 2 nm in film thickness, the effect of the provision of the oxidation prevention layer 14 tends to decrease. The effect of the oxidation prevention layer 14 is substantially the same in the range of film thickness above 3 nm. The upper limit of the preferable range of film thickness of the oxidation prevention layer 14 may be restricted by the film thickness that causes degradation of writing easiness.

The first underlayer 15 is 2 nm to 16 nm in film thickness, and is formed of Ru or a Ru—X alloy (where X is formed of at least one selected from the group consisting of Ta, Nb, Co, Cr, Fe, Ni, Mn, and C) having an hcp (hexagonal close-packed) crystal structure. Referring to FIG. 2, the first underlayer 15 has crystal grains 15a joined through a grain boundary part 15b so as to form a continuous film. Therefore, the crystal grains 15a have good crystallinity. Further, the first underlayer 15 has its (0002) crystal plane preferentially oriented on the oxidation prevention layer 14 in parallel with the substrate surface. Since the crystal grains 15a have good crystallinity, the crystal grains 15a also have good crystal orientation. Therefore, crystal grains 16a of the second underlayer 16 have better crystallinity and crystal orientation, and further, the magnetic particles of the recording layer 18 have better crystallinity and crystal orientation. This further improves recording and reproduction characteristics, thus making it possible to increase recording density.

The second underlayer 16 includes the multiple crystal grains 16a, formed of Ru or the Ru—X alloy having an hcp crystal structure, and an air gap part 16b separating the crystal grains 16a. Each of the crystal grains 16a has a columnar structure growing in the direction of film thickness from the surface of the first underlayer 15 up to the interface with the recording layer 18. Each crystal grain 16a is formed of a single crystal.

Further, the air gap part 16b, which is formed so as to surround the crystal grains 16a, separates the crystal grains 16a from one another. Since the magnetic particles 18a of the recording layer 18 perform crystal growth on the corresponding crystal grains 16a, the above-described structure of the second underlayer 16 makes it possible to suitably separate the magnetic particles 18a of the recording layer 18 from one another. As is described in detail below, the second underlayer 16 can be formed by setting the pressure in an inert gas atmosphere of Ar gas or the like or the deposition rate of the second underlayer 16 to a value in a predetermined range.

The recording layer 18 includes the magnetic particles 18a, each being, for example, 6 nm to 20 nm in film thickness and having a columnar structure, and a non-solid-solution phase 18b formed of a non-magnetic material surrounding the magnetic particles 18a so that the adjacent magnetic particles 18a are physically separated. The columnar structure of each magnetic particle 18a extends in the directions of film thickness, and the spaces among the multiple magnetic particles 18a oriented in an in-plane direction are filled with the non-solid-solution phase 18b.

The magnetic particles 18a are formed of a material selected from the group consisting of Co, CoCr, CoPt, CoCrTa, CoCrPt, and CoCrPt alloys including CoCrPt-M, where M is selected from the group consisting of B, Ta, Cu, W, Mo, and Nb. The magnetic particles 18a have a magnetocrystalline easy axis in the directions of film thickness. If the ferromagnetic alloy forming the magnetic particles 18a has an hcp structure, it is preferable that the magnetic particles 18a have a (001) plane in the direction of film thickness, that is, in the direction of growth.

If the magnetic particles 18a are formed of a CoCrPt alloy, the Co content is 50 at % to 80 at %, the Cr content is 5 at % to 20 at %, and the Pt content is 15 at % to 30 at %. Increasing the Pt content compared with the conventional perpendicular magnetic recording medium makes it possible to increase a perpendicular anisotropic-magnetic field and thereby achieve high coercive force. It has been considered difficult in particular for magnetic particles of such a high Pt content to epitaxially grow on a Cr-based underlayer. However, employment of the material of the magnetic particles 18a according to this embodiment makes it possible to form the magnetic particles 18a of excellent crystallinity.

The non-solid-solution phase 18b is formed of a non-magnetic material that does not form solid solution or a compound with the ferromagnetic alloy forming the magnetic particles 18a. The non-magnetic material is formed of a compound of an element selected from Si, Al, Ta, Zr, Y, Ti, and Mg and an element selected from O, N, and C. Examples of the non-magnetic material include oxides such as $SiO_2$, $Al_2O_3$, $Ta_2O_5$, $ZrO_2$, $Y_2O_3$, $TiO_2$, and MgO, nitrides such as $Si_3N_4$, AlN, TaN, ZrN, TiN, and $Mg_3N_2$, and carbides such as SiC, TaC, ZrC, and TiC. Each magnetic particle 18a is physically separated from its adjacent magnetic particles 18a by the non-solid-solution phase 18b formed of such a non-magnetic material. Therefore, the magnetic interaction between the magnetic particles 18a is reduced, so that it is possible to reduce medium noise.

Further, although not graphically illustrated, an air gap part may be formed in place of the non-solid-solution phase 18b in the recording layer 18. Separation of the magnetic particles 18a by the air gap part produces the same effects as in the case of the non-solid-solution phase 18b.

The protection film 19 is formed of, for instance, amorphous carbon, hydrogenated carbon, carbon nitride, or aluminum oxide of 0.5 nm to 15 nm in film thickness.

The lubricating layer 20 is formed of, for example, a lubricant having a main chain of perfluoropolyether of 0.5 nm to 5 nm in film thickness. The lubricating layer 20 may be either provided or not provided depending on the material of the protection film 19.

According to the perpendicular magnetic recording medium 10 of this embodiment, oxidation of the surface of the oxidation prevention layer 14 is prevented by providing the oxidation prevention layer 14 between the seed layer 13 and the first underlayer 15, thereby preventing degradation of the crystallinity and crystal orientation of the initial growth part of the crystal grains 15a of the first underlayer 15 due to formation of an oxidized part. As a result, the first underlayer 15 has good crystal orientation, which is inherited by the second underlayer 16 and the recording layer 18, thereby improving the crystal orientation of the magnetic particles 18a. This results in better recording and reproduction characteristics, so that the perpendicular magnetic recording medium 10 can have high recording density.

Further, provision of the oxidation prevention layer 14 causes uniform nucleation of the crystal grains 15a of the first underlayer 15, so that the crystal grains 15a are evenly disposed in the in-plane directions. This even disposition is inherited to the disposition of the crystal grains 16a of the second underlayer 16 and further to the magnetic particles 18a of the recording layer 18, so that the magnetic particles 18a are evenly disposed in the in-plane directions. As a result, medium noise is reduced, so that signal-to-noise ratio is improved. This also makes it possible to achieve high recording density of the perpendicular magnetic recording medium 10.

As described above, it is preferable to provide the first underlayer 15. However, the first underlayer 15 may be omitted. In this case, the crystal grains 16a of the second underlayer 16 perform crystal growth directly on the surface of the oxidation prevention layer 14. Further, a preferable structure of the layered soft magnetic underlayer body 12 is that the soft magnetic amorphous layers 12a and 12a be antiferromagnetically exchange-coupled as described above. Alternatively, the layered soft magnetic underlayer body 12 may have only the single soft magnetic amorphous layer 12a.

Next, a description is given, with reference to FIG. 1, of a method of manufacturing the perpendicular magnetic recording medium 10 according to the first embodiment.

First, after cleaning and drying the surface of the substrate 11, the amorphous soft magnetic layer 12a, the non-magnetic coupling layer 12c, and the amorphous soft magnetic layer 12b of the above-described layered soft magnetic underlayer body 12 are formed in this order on the substrate 11 by sputtering.

Next, the seed layer 13 is formed on the layered soft magnetic underlayer body 12 with a sputtering apparatus using a sputtering target formed of the above-described material. For the sputtering apparatus, it is preferable to use an ultrahigh vacuum sputtering apparatus that can be evacuated to $10^{-7}$ Pa in advance. Specifically, the seed layer 13 is formed at a pressure of 0.4 Pa in an Ar gas atmosphere by DC magnetron sputtering. At this point, it is preferable to apply no heat to the substrate 11. It is possible to prevent crystallization of the amorphous soft magnetic layers 12a and 12b. The substrate 11 may be heated to temperatures that do not cause crystallization of the amorphous soft magnetic layers 12a and 12b. For example, the substrate 11 may be heated to a temperature of approximately 150° C. or less. Heating of the substrate 11 is the same in formation of each of the seed layer 13, the oxidation prevention layer 14, the first underlayer 15, the second underlayer 16, the recording layer 18, and the protection film 19.

Next, the oxidation prevention layer 14 is formed on the seed layer 13 at a pressure of 0.4 Pa in an Ar gas atmosphere by, for example, DC magnetron sputtering using a sputtering apparatus.

Next, the first underlayer 15 is formed on the oxidation prevention layer 14 using a sputtering target formed of Ru or the above-described Ru—X alloy having an hcp crystal structure. Specifically, the first underlayer 15 is formed at a deposition rate higher than or equal to 5 nm/sec and at a pressure higher than or equal to 2.66 Pa (20 mTorr) in an inert gas atmosphere such as an Ar gas atmosphere by, for example, DC magnetron sputtering. By thus setting deposition rate and pressure, it is possible to form the first underlayer 15 of a polycrystalline continuous film of the crystal grains 15a and the grain boundary part 15b. Further, setting such a deposition rate and pressure prevents the crystal grains 15a from increasing in size. Alternatively, the deposition rate and pressure for the first underlayer 15 may be 3 nm/sec or lower and 2.66 Pa (20 mTorr) or lower, respectively. Setting these deposition rate and pressure prevents the crystal grains 15a from increasing in size, and causes the material of the first underlayer 15 to have high purity.

By thus setting deposition rate and pressure, it is possible to form the first underlayer 15 of a polycrystalline continuous film of the crystal grains 15a and the grain boundary part 15b.

It is preferable that the deposition rate and pressure be in their above-described respective ranges. The deposition rate is preferably 8 nm/sec or lower in terms of good film thickness controllability. The pressure is preferably 0.26 Pa or higher in terms of stability of the plasma discharge of the sputtering apparatus.

Next, the second underlayer 16 is formed on the first underlayer 15 using a sputtering target formed of Ru or the above-described Ru—X alloy having an hcp crystal structure. Specifically, the second underlayer 16 is formed in an inert gas atmosphere such as an Ar gas atmosphere by, for example, DC magnetron sputtering. The formation is performed at a deposition rate lower than or equal to 1 nm/sec and at a pressure higher than or equal to 2.66 Pa (20 mTorr). By thus setting deposition rate and pressure, it is possible to form the second underlayer 16 of the above-described crystal grains 16a and air gap part 16b. Here, if the deposition rate is higher than 1 nm/sec or the pressure is lower than 2.66 Pa, the air gap part 16b tends to be formed insufficiently, thus causing formation of a continuous film of crystal grains and a grain boundary part.

The deposition rate is preferably 0.1 nm/sec or higher in terms of prevention of excessive reduction in production efficiency. Further, the pressure is preferably 26.6 Pa (200 mTorr) or lower. If the pressure is higher than 26.6 Pa, the inert gas tends to be captured in the crystal grains 16a to reduce their crystallinity and further cause formation of powder. For the same reason as described above, it is preferable not to apply heat to the substrate 11 at the time of forming the second underlayer 16.

Next, the recording layer 18 is formed on the second underlayer 16 with a sputtering apparatus using a sputtering target formed of the above-described material. Specifically, the recording layer 18 is formed in an inert gas atmosphere or in an atmosphere where oxygen or nitrogen, included in the non-solid-solution phase 18b, is added to an inert gas by RF magnetron sputtering using a composite sputtering target of the magnetic material of the magnetic particles 18a and the non-magnetic material of the non-solid-solution phase 18b. Instead of using such a sputtering target, the sputtering target of the magnetic material of the magnetic particles 18a and the sputtering target of the non-magnetic material of the non-solid-solution phase 18b may be sputtered simultaneously. The pressure at the time of forming the recording layer 18 is preferably in the range of 2.00 Pa to 8.00 Pa (more preferably 2.00 Pa to 3.99 Pa). As a result, the recording layer 18 of the magnetic particles 18a and the non-solid-solution phase 18b surrounding and separating the magnetic particles 18a is formed.

Alternatively, the recording layer 18 may be formed of the magnetic particles 18a and an air gap part surrounding and separating the magnetic particles 18a. Specifically, this recording layer 18 is formed in an inert gas atmosphere such as an Ar gas atmosphere by, for example, DC magnetron sputtering using a sputtering target of the magnetic material of the magnetic particles 18a. The magnetic particles 18a of the recording layer 18 grow on the surfaces of the corresponding crystal grains 16a of the second underlayer 16, and an air gap part is formed around the magnetic particles 18a. The pressure at the time of forming the recording layer 18 is the same as in the case of forming the non-solid-solution phase 18b.

Next, the protection film 19 is formed on the recording layer 18 using sputtering, CVD, or FCA (Filtered Cathodic Arc). Next, the lubricating layer 20 is applied on the surface of the protection film 19 by a dip method, spin coating, or liquid level lowering. Thereby, the perpendicular magnetic recording medium 10 according to the first embodiment is formed.

According to the method of manufacturing a perpendicular magnetic recording medium of the first embodiment, even if oxygen gas is included as an impurity gas in an atmospheric gas, provision of the oxidation prevention layer 14 causes the crystal grains 15a of the first underlayer 15 formed thereon to have good crystallinity and crystal orientation because the oxidation prevention layer 14 has good resistance to oxidation. Further, the good crystallinity and crystal orientation are inherited by the second underlayer 16 and the recording layer 18, so that the magnetic particles 18a have better crystal orientation. As a result, it is possible to manufacture a perpendicular magnetic recording medium having better recording and reproduction characteristics and capable of achieving high recording density.

Next, a description is given of examples according to the first embodiment.

Example 1

A perpendicular magnetic recording medium according to Example 1 was made with the configuration shown below. The parenthesized values indicate film thickness.

Glass Substrate
Soft magnetic underlayer: CoZrNb film (200 nm)
Seed layer: Ta film (2 nm)
Oxidation prevention layer: Pt film (3 nm)
First underlayer: Ru film (15 nm)
Second underlayer: Ru film (5 nm)
Recording layer: $(CoCrPt_{15})_{87}$—$(SiO_2)_{13}$ film (16 nm)
Protection film: Carbon film (3 nm)
Lubricating layer: Perflubropolyether (1.5 nm)

According to the perpendicular magnetic recording medium of Example 1, after cleaning and drying a glass substrate, a CoZrNb film, a Ta film, and a Pt film having their respective film thicknesses described above were formed in this order on the glass substrate at a pressure of 0.266 Pa (2 mTorr) in an Ar gas atmosphere by DC magnetron sputtering without applying heat to the glass substrate.

Next, the Ru film of a first underlayer was formed to have the above-described film thickness at a pressure of 0.399 Pa (3 mTorr) and at a film formation rate of 0.6 nm/sec in an Ar gas atmosphere by DC magnetron sputtering. Then, the Ru film of a second underlayer was formed to have the above-described film thickness at a pressure of 5.32 Pa (40 mTorr) and at a film formation rate of 0.3 nm/sec in an Ar gas atmosphere by DC magnetron sputtering.

Next, a recording layer was formed at a pressure of 2.66 Pa (20 mTorr) in an Ar gas atmosphere by RF sputtering using a composite sputtering target of a $(CoCrPt_{15})_{87}$—$(SiO_2)_{13}$ film.

Next, a carbon film was formed at a pressure of 0.399 Pa (3 mTorr) in an Ar gas atmosphere by DC magnetron sputtering. Further, a lubricating layer was applied by dipping, so that the perpendicular magnetic recording medium of Example 1 was obtained.

Comparative Example 1

As the perpendicular magnetic recording medium of Comparative Example 1 not according to the present invention, a perpendicular magnetic recording medium having the same configuration as the perpendicular magnetic recording medium of Example 1 except for not having the Pt film of an oxidation prevention layer was formed under the same making conditions as Example 1.

With respect to the perpendicular magnetic recording medium of each of Example 1 and Comparative Example 1, the rocking curve of diffraction lines corresponding to the Ru (0002) crystal plane was measured using an X-ray diffractometer (Cu—Kα ray), and half width ($\Delta\theta_{50}$) was measured from the profile of the rocking curve.

As a result, $\Delta\theta_{50}$ was 7.2 degrees in Comparative Example 1, while $\Delta\theta_{50}$ was 5.7 degrees in Example 1. This shows that the orientation of the (0002) crystal plane of the Ru film is much better in Example 1 than in Comparative Example 1. Accordingly, it is shown that the crystal orientation of the (0002) crystal plane of the Ru film of each of the first underlayer and the second underlayer is excellent because of provision of the Pt film of the oxidation prevention layer. This provides a good reason to expect that the magnetic particles of the recording layer have good magnetocrystalline easy axis orientation.

Example 2

Perpendicular magnetic recording media according to Example 2 were made with the configuration shown below. The parenthesized values indicate film thickness.

Glass Substrate
Soft magnetic underlayer: CoZrNb film (200 nm)
Seed layer: Ta film (4.5 nm)
Oxidation prevention layer: Pt film (3 nm)
First underlayer: Ru film
Second underlayer: Ru film (3.7 nm)
Recording layer: $(CoCrPt_{15})_{87}$—$(SiO_2)_{13}$ film (16 nm)
Protection film: Carbon film (3 nm)
Lubricating layer: Perfluoropolyether (1.5 nm)

The perpendicular magnetic recording media of Example 2 were made under substantially the same conditions as those of Example 1. In Example 2, the perpendicular magnetic recording media were made so that their first underlayers were 7 nm, 15 nm, and 22.5 nm, respectively, in film thickness.

Comparative Examples 2 and 3

As the perpendicular magnetic recording media of Comparative Example 2 not according to the present invention, perpendicular magnetic recording media having the same configuration as the perpendicular magnetic recording media of Example 2 except for not having the Pt film of an oxidation prevention layer were made under the same making conditions as Example 2. In Comparative Example 2, the perpendicular magnetic recording media were also made so that their respective first underlayers were different in film thickness the same as in Example 2.

Further, as the perpendicular magnetic recording media of Comparative Example 3 not according to the present invention, perpendicular magnetic recording media having the same configuration as the perpendicular magnetic recording media of Comparative Example 2 except that the Ta film of the seed layer was 3 nm in film thickness were made under the same making conditions as Comparative Example 2.

Figure 3:
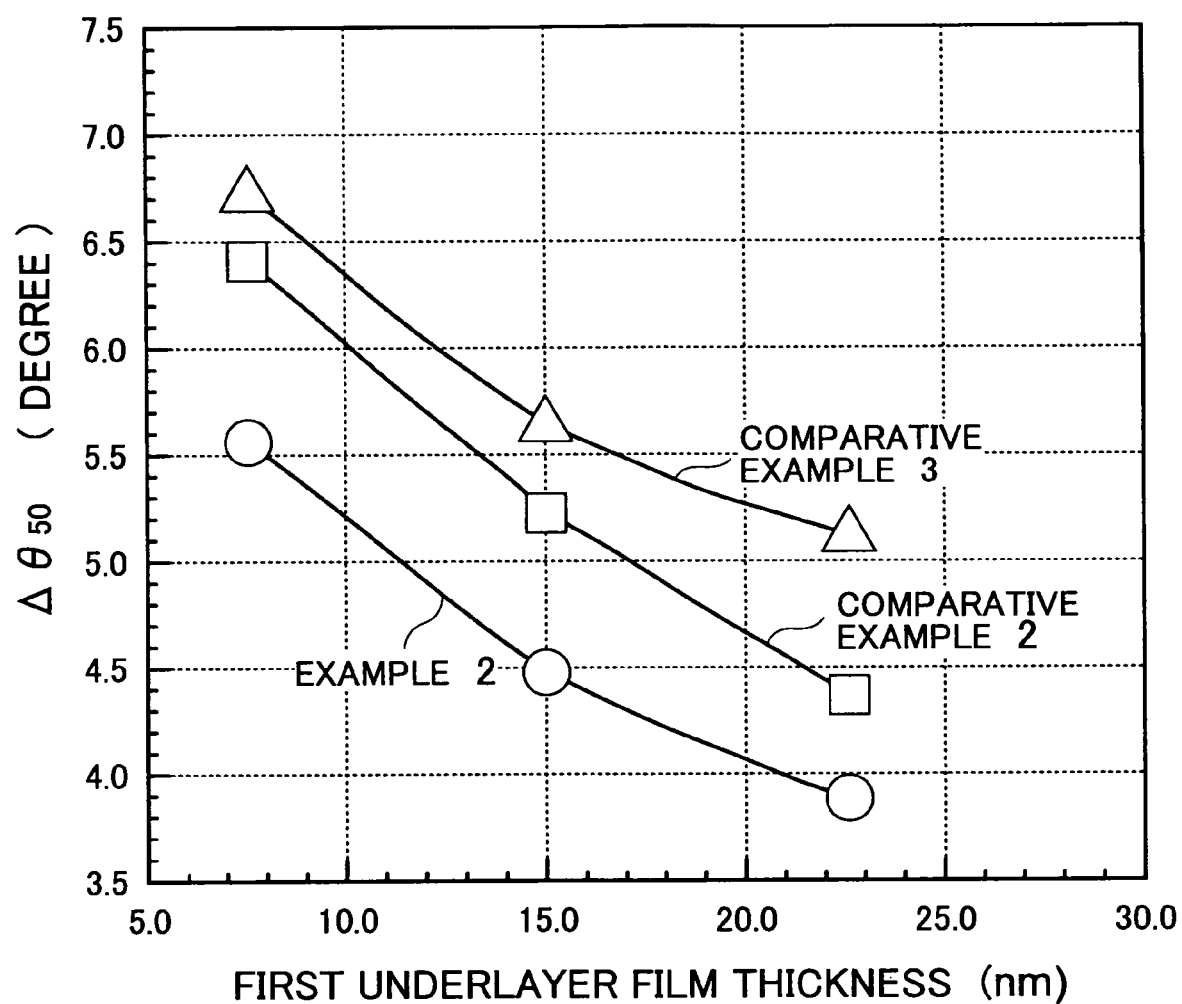
FIG. 3 is a graph showing the relationship between the crystal orientation of a Ru film and the film thickness of the Ru film of a first underlayer of each of an example and comparative examples according to the first embodiment of the present invention.

FIG. 3 is a graph showing the relationship between the crystal orientation of the Ru film and the film thickness of the Ru film of the first underlayer of each of Example 2 and Comparative Examples 2 and 3. The vertical axis indicates $\Delta\theta_{50}$ of diffraction lines corresponding to the (0002) crystal plane of the Ru film. $\Delta\theta_{50}$ was measured in the same manner as in Example 1. The measurement results reflect the crystal orientations of the Ru films of both first and second underlayers. Further, the horizontal axis indicates the film thickness of the Ru film of the first underlayer.

Referring to FIG. 3, $\Delta\theta_{50}$ of Example 2 is smaller than those of Comparative Examples 2 and 3 with respect to each of the three film thicknesses of the first underlayer. This shows that the orientation of the (0002) crystal plane of the Ru film is much better in Example 2 than in Comparative Examples 2 and 3. Accordingly, it is shown that the crystal orientation of the (0002) crystal plane of the Ru film of each of the first underlayer and the second underlayer is excellent because of provision of the Pt film of the oxidation prevention layer. This provides a good reason to expect that the magnetic particles of the recording layer have good magnetocrystalline easy axis orientation.

Examples 3 and 4 and Comparative Examples 4-6

As the perpendicular magnetic recording media of Examples 3 and 4, perpendicular magnetic recording media different in the film thickness of the Pt film of the oxidation prevention layer were made.

The perpendicular magnetic recording media of Example 3 have the same configuration as the perpendicular magnetic recording media of Example 2 except that the film thickness of the Ru film of the first underlayer is 15 nm and that their respective Pt films are 3.0 nm, 6.0 nm, and 10.0 nm in film thickness. For comparison, a perpendicular magnetic recording medium having the same configuration as Example 3 except for not having a Pt film was made as the perpendicular magnetic recording medium of Comparative Example 4.

The perpendicular magnetic recording media of Example 4 have the same configuration as the perpendicular magnetic recording media of Example 2 except that the film thickness of the Ru film of the first underlayer is 22.5 nm and that their respective Pt films are 3.0 nm, 6.0 nm, and 10.0 nm in film thickness. For comparison, a perpendicular magnetic recording medium having the same configuration as Example 4 except for not having a Pt film was made as the perpendicular magnetic recording medium of Comparative Example 5. Further, for comparison, a perpendicular magnetic recording medium having the same configuration as Comparative Example 5 except that the Ta film of the seed layer was 2.0 nm in film thickness was made as the perpendicular magnetic recording medium of Comparative Example 6.

Figure 4:
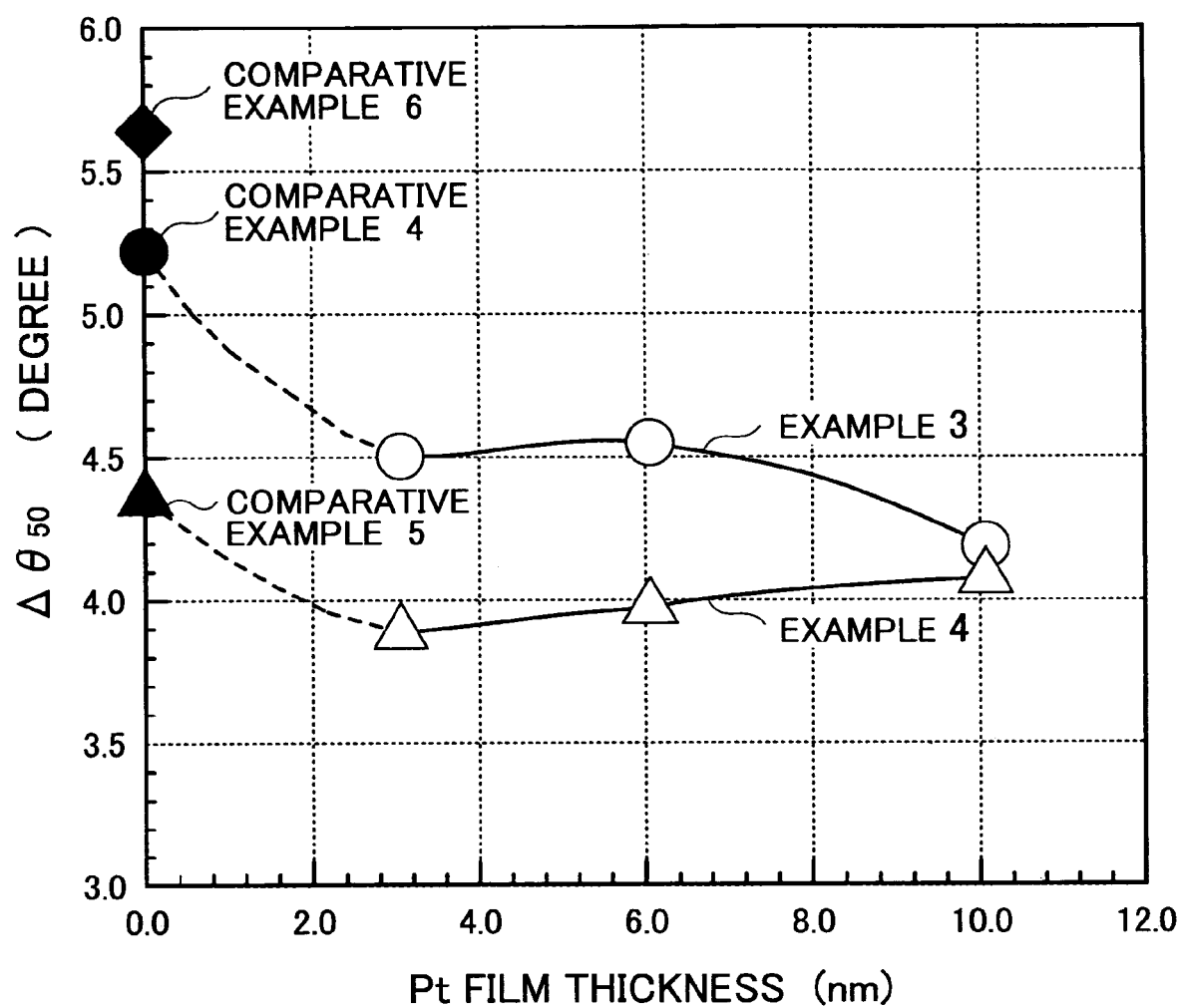
FIG. 4 is a graph showing the relationship between the crystal orientation of a Ru film and the film thickness of the Pt film of an oxidation prevention layer of each of examples and comparative examples according to the first embodiment of the present invention.

FIG. 4 is a graph showing the relationship between the crystal orientation of the Ru film and the film thickness of the Pt film of the oxidation prevention layer of each of Examples 3 and 4 and Comparative Examples 4-6. The vertical axis indicates $\Delta\theta_{50}$ of diffraction lines corresponding to the (0002) crystal plane of the Ru film. $\Delta\theta_{50}$ was measured in the same manner as in Example 1. The measurement results reflect the crystal orientations of the Ru films of both first and second underlayers. Further, the horizontal axis indicates the film thickness of the Pt film of the oxidation prevention layer.

Referring to FIG. 4, $\Delta\theta_{50}$ of Example 3 is smaller than that of Comparative Example 4, in which no Pt film is provided, over the Pt film thickness range of 3.0 nm to 1.0.0 nm. This shows that the orientation of the (0002) crystal plane of the Ru film is much better in Example 3 than in Comparative Example 4 over the Pt film thickness range of 3.0 nm to 10.0 nm. Further, it is inferred from this characteristic line that the orientation of the (0002) crystal plane of the Ru film is also better in Example 3 than in Comparative Example 4 in the range where the Pt film is thinner than 3.0 nm and that the orientation of the (0002) crystal plane of the Ru film is also better in Example 3 than in Comparative Example 4 at a Pt film thickness of 2.0 nm.

Further, $\Delta\theta_{50}$ of Example 4 is smaller than that of Comparative Example 5, in which no Pt film is provided, over the Pt film thickness range of 3.0 nm to 10.0 nm. This shows that the orientation of the (0002) crystal plane of the Ru film is much better in Example 4 than in Comparative Example 5 over the Pt film thickness range of 3.0 nm to 10.0 nm. Further, it is inferred from this characteristic line that the orientation of the (0002) crystal plane of the Ru film is also better in Example 4 than in Comparative Example 5 in the range where the Pt film is thinner than 3.0 nm and that the orientation of the (0002) crystal plane of the Ru film is also better in Example 4 than in Comparative Example 5 at a Pt film thickness of 2.0 nm. Further, the orientation of the (0002) crystal plane of the Ru film is also better in Examples 3 and 4 than in Comparative Example 6.

Second Embodiment

A second embodiment of the present invention relates to a magnetic storage unit including a perpendicular magnetic recording medium according to the first embodiment.

Figure 5:
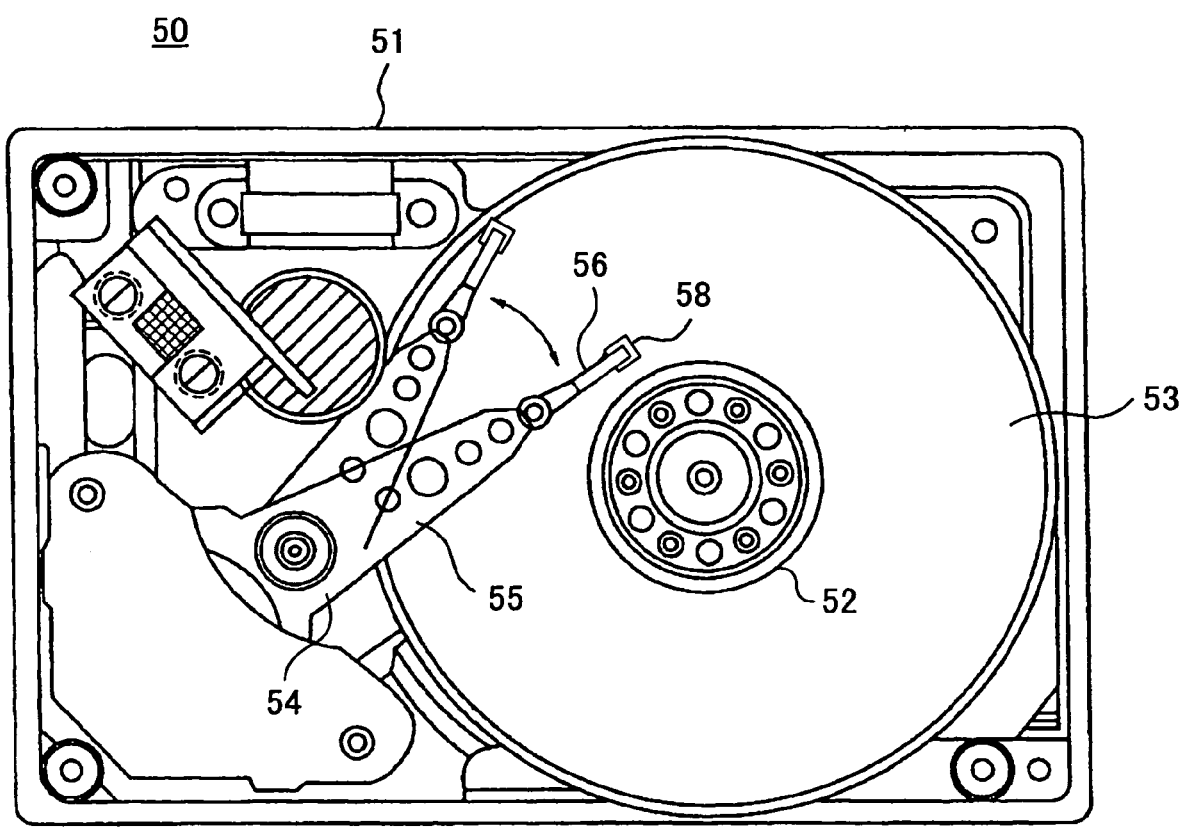
FIG. 5 is a plan view of part of a magnetic storage unit according to a second embodiment of the present invention.

FIG. 5 is a diagram showing part of a magnetic storage unit 50 according to the second embodiment of the present invention. Referring to FIG. 5, the magnetic storage unit includes a housing 51. Further, the magnetic storage unit includes a hub 52 driven by a spindle (not graphically illustrated), a perpendicular magnetic recording medium 53 rotatably fixed to the hub 52, an actuator unit 54, an arm 55 and a suspension 56 attached to the actuator unit 54 so as to be movable in the radial directions of the perpendicular magnetic recording medium 53, and a magnetic head 58 supported by the suspension 56, which are provided in the housing 51.

The magnetic head 58 is formed of, for example, a single-pole recording head and a reproduction head including a GMR (giant magnetoresistive) element.

The single-pole recording head includes a main pole formed of a soft magnetic material for applying a recording magnetic field to the perpendicular magnetic recording medium 53, a return yoke magnetically connected to the main pole, and a recording coil for guiding a recording magnetic field to the main pole and the return yoke. The single-pole recording head forms perpendicular magnetization in the perpendicular magnetic recording medium 53 by applying a recording magnetic field in a direction perpendicular to the perpendicular magnetic recording medium 53 from the main pole.

Further, the reproduction head includes a GMR element. The GMR element can obtain information recorded in the recording layer of the perpendicular magnetic recording medium 53 by sensing as a change in resistance the direction of a magnetic field in which the magnetization of the perpendicular magnetic recording medium 53 leaks. A TMR (tunnel magnetoresistive) element may be used in place of the GMR element.

The perpendicular magnetic recording medium 53 is a perpendicular magnetic recording medium according to the first embodiment. The recording layer of the perpendicular magnetic recording medium 53 has better crystal orientation, so that the perpendicular magnetic recording medium 53 has good recording and reproduction characteristics. At the same time, the perpendicular magnetic recording medium 53 has excellent signal-to-noise ratio, and can achieve high recording density.

The basic configuration of the magnetic storage unit 50 according to the second embodiment is not limited to the one shown in FIG. 5. The magnetic head 58 is not limited to the above-described configuration, and may be replaced by a known magnetic head. Further, the perpendicular magnetic recording medium 53 employed in this embodiment is not limited to a magnetic disk, and may be a magnetic tape.

According to the second embodiment, the magnetic storage unit 50 has good recording and reproduction characteristics and excellent signal-to-noise ratio, and can achieve high recording density.

According to one aspect of the present invention, oxidation of the surface of an oxidation prevention layer is prevented by providing the oxidation prevention layer including a noble metal element other than Ru between a seed layer and an underlayer. If an oxidized part is formed on the surface of the oxidation prevention layer, the crystallinity and the crystal orientation of the initial growth part of the crystal grains of the underlayer formed of Ru or a Ru alloy having an hcp structure are degraded. However, since the oxidation prevention layer has good resistance to oxidation, an oxidized part is prevented from being generated on the surface of the oxidation prevention layer. As a result, the underlayer has good crystal orientation, which is inherited by the recording layer, so that the magnetic particles of the recording layer have better crystal orientation. This results in good recording and reproduction characteristics, so that a perpendicular magnetic recording medium can achieve high recording density.

According to another aspect of the present invention, a magnetic storage unit has good recording and reproduction characteristics and excellent signal-to-noise ratio, and can achieve high recording density.

According to another aspect of the present invention, even if oxygen gas is included as an impurity gas in an atmospheric gas, provision of an oxidation prevention layer causes the crystal grains of an underlayer formed thereon to have good crystallinity and crystal orientation because the oxidation prevention layer has good resistance to oxidation. Further, the good crystallinity and crystal orientation are inherited by a recording layer, so that its magnetic particles have better crystal orientation. As a result, it is possible to manufacture a perpendicular magnetic recording medium having better recording and reproduction characteristics and capable of achieving high recording density.

The present invention is not limited to the specifically disclosed embodiments, and variations and modifications may be made without departing from the scope of the present invention.

What is claimed is:

1. A perpendicular magnetic recording medium, comprising:
   a substrate;
   a soft magnetic underlayer formed on the substrate;
   a seed layer of an amorphous material formed on the soft magnetic underlayer;
   an oxidation prevention layer formed on the seed layer;
   an underlayer formed on the oxidation prevention layer, the underlayer including a plurality of crystal grains formed of one of Ru and a Ru alloy having an hcp crystal structure, and a first air gap part configured to separate the crystal grains from each other; and
   a recording layer formed on the underlayer, the recording layer including a plurality of magnetic particles having a magnetocrystalline easy axis in a direction substantially perpendicular to a surface of the substrate, and one of a second air gap part and a non-magnetic non-solid-solution phase, the one being configured to separate the magnetic particles from each other, wherein the oxidation prevention layer includes a noble metal element other than Ru, the noble metal element being Pt.

2. The perpendicular magnetic recording medium as claimed in claim 1, further comprising:

an additional underlayer between the seed layer and the underlayer, wherein the additional underlayer is formed of a continuous film into which a first crystal grain and a second crystal grain are joined through a grain boundary part, the first and second crystal grains being formed of one of Ru and a Ru alloy.

3. The perpendicular magnetic recording medium as claimed in claim 1, wherein the Ru alloy having the hcp crystal structure is a Ru—X alloy, where X is at least one selected from the group consisting of Ta, Nb, Co, Cr, Fe, Ni, Mn, and C.

4. The perpendicular magnetic recording medium as claimed in claim 1, wherein a film thickness of the oxidation prevention layer is greater than or equal to 2.0 nm.

5. The perpendicular magnetic recording medium as claimed in claim 1, wherein the seed layer comprises at least one amorphous non-magnetic material selected from the group consisting of Ta, Ti, Mo, W, Re, Hf, and Mg.

6. The perpendicular magnetic recording medium as claimed in claim 1, wherein the magnetic particles of the recording layer comprise one selected from the group consisting of Co, CoCr, CoPt, CoCrTa, CoCrPt, and CoCrPt-M, where said M is at least one selected from the group consisting of B, Ta, Cu, W, Mo, and Nb.

7. The perpendicular magnetic recording medium as claimed in claim 1, wherein:

the soft magnetic underlayer comprises a first soft magnetic layer, a non-magnetic coupling layer, and a second soft magnetic layer stacked in this order from a side of the substrate; and each of the first soft magnetic layer and the second soft magnetic layer has a magnetocrystalline easy axis in plane, and magnetization of the first soft magnetic layer and magnetization of the second soft magnetic layer are oriented in plane and are antiferromagnetically coupled to each other.

8. A magnetic storage unit, comprising:

a recording and reproduction part including a magnetic head; and the perpendicular magnetic recording medium as claimed in claim 1.

* * * * *